(12) United States Patent
Kerr et al.

(10) Patent No.: US 8,818,119 B2
(45) Date of Patent: Aug. 26, 2014

(54) DYNAMIC CREATION OF TREND GRAPH

(71) Applicant: Agilent Technologies, Inc., Loveland, CO (US)

(72) Inventors: Brian W. Kerr, Monument, CO (US); Matthew S. Holcomb, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 134 days.

(21) Appl. No.: 13/628,010

(22) Filed: Sep. 26, 2012

(65) Prior Publication Data

US 2014/0086499 A1 Mar. 27, 2014

(51) Int. Cl.
*G06K 9/36* (2006.01)
*G06T 9/00* (2006.01)
*G06K 9/46* (2006.01)

(52) U.S. Cl.
CPC ..................................... *G06T 9/00* (2013.01)
USPC ........................................................ 382/232

(58) Field of Classification Search
USPC ............... 382/232, 291; 348/148, E07.085; 375/240.08, E07.026; 726/2
See application file for complete search history.

(56) References Cited

U.S. PATENT DOCUMENTS

| | | | |
|---|---|---|---|
| 5,663,493 A | 9/1997 | Gerbert et al. | |
| 5,684,507 A | 11/1997 | Rasnake et al. | |
| 5,790,133 A | 8/1998 | Holcomb et al. | |
| 7,650,249 B2 | 1/2010 | Wegener | |
| 7,873,986 B2 * | 1/2011 | Nishibayashi et al. | 726/2 |
| 7,923,622 B2 | 4/2011 | Lazovic | |
| 8,055,077 B2 | 11/2011 | Mucha et al. | |
| 2004/0263164 A1 | 12/2004 | Kurimoto et al. | |
| 2006/0193534 A1 * | 8/2006 | Hirose | 382/291 |
| 2008/0243406 A1 | 10/2008 | Pupalaikis | |
| 2010/0036631 A1 | 2/2010 | Atoro et al. | |
| 2010/0123779 A1 * | 5/2010 | Snyder et al. | 348/148 |
| 2011/0213577 A1 | 9/2011 | Mousavi et al. | |
| 2011/0310965 A1 * | 12/2011 | Nishibayashi et al. | 375/240.08 |
| 2014/0086499 A1 * | 3/2014 | Kerr et al. | 382/232 |

FOREIGN PATENT DOCUMENTS

| | | |
|---|---|---|
| JP | 2003225219 A | 8/2003 |
| JP | 2003307530 A | 10/2003 |
| JP | 2004251747 A | 9/2004 |

OTHER PUBLICATIONS

Sengupta, et al. "Measuring Complexity of Component Based Architecture: A Graph based Approach", ACM SIGSOFT Software Engineering Notes, vol. 36, No. 1 (Jan. 2011).

Perelman, et al. "A Low-Light-Level Sensor for Medical Diagnostic Applications", IEEE Journal of Solid-State Circuits, vol. 36, No. 10, Oct. 2001, p. 1553-1558.

* cited by examiner

*Primary Examiner* — Amir Alavi

(57) ABSTRACT

A method of generating a trend graph comprises storing a stream of data elements in a buffer having a storage capacity corresponding to a first number of data elements, compressing the stored data elements to fit within a display having a size corresponding to a second number of data elements smaller than the first number of data elements, detecting an event, and as a consequence detecting the event, compressing the stored data elements to occupy a reduced portion of the buffer.

20 Claims, 19 Drawing Sheets

DYNAMIC CREATION OF TREND GRAPH

BACKGROUND

A trend graph provides a visual representation of how acquired data values change over time. For example, a trend graph may show fluctuations of minimum and maximum stock prices from day-to-day or week-to-week or patterns of minimum and maximum voltage levels over a sequence of measurement intervals.

In many contexts, a trend graph is generated dynamically as data is captured or received. For example, the trend graph may be continuously updated in real-time to reflect the latest data. This dynamic process allows an observer to witness data trends as they unfold, which can be beneficial, for instance, where the observer is required to take action based on the trends. In one example, a stock broker may wish to view the latest patterns of stock prices in order to make ongoing decisions on whether to buy or sell stocks. In another example, a user of a digital multi-meter (DMM) may wish to view trends within contemporaneous measurement values in order to determine how to proceed with an ongoing measurement process.

Unfortunately, the process of displaying a continuously changing trend graph can be complicated by many factors. One complicating factor is that most display systems provide a limited amount of space in which to display information. For example, most DMM displays have a fixed pixel-width that limits the number of data points that can be displayed horizontally in a graph. Consequently, as the amount of acquired data increases, it will eventually fill or exceed the available viewing space. Another complicating actor is that most systems have a limited amount of memory for storing acquired data. For example, a DMM may have a fixed-size buffer for capturing a stream of incoming measurement data. As a result, it may run out of memory for storing new time-based measurements after a predetermined time elapses.

Some conventional systems address the above problems by requiring a user to specify a priori an interval over which data is to be gathered. This allows a system to set the scale of its display and/or the frequency of its measurements according to the specified interval. Some other systems may adjust the frequency of measurements automatically to compensate for limited display area and/or memory capacity. Still other systems may include large amounts of memory in an attempt to accommodate an anticipated amount of measurement data, or they may simply set hard limits on the amount of data that can be captured and displayed.

These conventional approaches suffer from various shortcomings that can limit performance, cost, and flexibility. For example, placing limits on the interval or frequency of data capture may be inconvenient or impractical when performing certain types of measurements, such as those involving data sequences of unknown or indefinite length. Additionally, it may be inefficient to provide a vast memory for data to be displayed in a trend graph. Due to these and other shortcomings, there is a general need for improved techniques and technologies for generating trend graphs in cases where the amount of information is unlimited.

SUMMARY

In a representative embodiment, a method of generating a trend graph comprises storing a stream of data elements in a buffer having a storage capacity corresponding to a first number of data elements, compressing the stored data elements to fit within a display having a size corresponding to a second number of data elements smaller than the first number of data elements, detecting an event, and as a consequence detecting the event, compressing the stored data elements to occupy a reduced portion of the buffer.

In another representative embodiment, a system for generating a trend graph comprises a buffer configured to store a first number of data elements, a mapping unit configured to compress the stored data elements to fit within a display capable of accommodating a second number of data elements smaller than the first number of data elements, and a controller configured to detect an event and to compress the stored data elements to occupy a reduced portion of the buffer as a consequence of detecting the event.

BRIEF DESCRIPTION OF THE DRAWINGS

The described embodiments are best understood from the following detailed description when read with the accompanying drawing figures. Wherever applicable and practical, like reference numerals refer to like elements.

DETAILED DESCRIPTION

Figure 1:
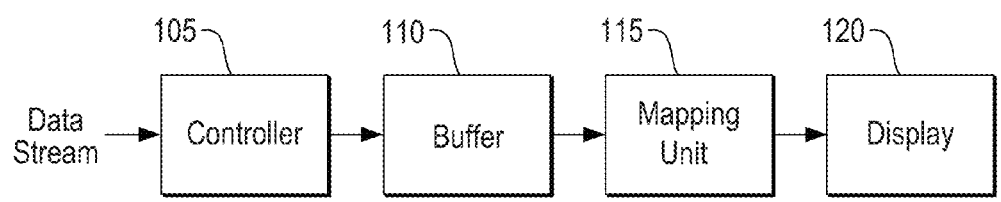
FIG. 1 is a block diagram illustrating a system configured to generate a trend graph according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices.

The described embodiments relate generally to techniques for creating a trend graph from a stream of data. For example, some embodiments allow a trend graph to be created dynamically based on a stream of measurement data of indeterminate length.

In certain embodiments, a display system receives a stream of measurement data as input. The data is placed in a data buffer that is multiple times larger than an available space of a display (e.g., pixel space) were the trend graph is to appear. The data is mapped onto the graph's width by one of several methods that spread the data as linearly as possible across the full width. This mapping is typically performed as part of a "sweep", i.e., when plotting data across a display as pixels. As new data arrives, it is redrawn at a greater compression factor to continuously till the full width of the display. The compression of data onto a display area can be referred to as "display compression" and is generally performed as part of the mapping. Once the data buffer becomes completely full, the stored data is compressed into a portion of the data buffer and the process continues indefinitely. The compression of buffer data into a smaller buffer area can be referred to as "buffer compression".

These and other embodiments may provide several potential benefits compared to conventional methods of generating trend graphs. For example, certain embodiments avoid a need to determine a priori the time interval over which data is to be gathered, or a need to decrease the frequency of taking measurements in order to accommodate a limited memory. Certain embodiments also avoid a need to have a large memory in order to display a long term trend in measurement data. In addition, certain embodiments use a full width of a display regardless of the number of measurements represented.

FIG. 1 is a block diagram illustrating a system 100 configured to generate a trend graph according to a representative embodiment. System 100 can take various alternative forms, such as an electronic test and measurement instrument, a standalone display apparatus, a personal computer, or a portable electronic device, to name but a few. Moreover, system 100 can be used to generate a trend graph from various alternative types of data, such as electronic measurement data, financial data, scientific data, and many others.

Referring to FIG. 1, system 100 comprises a controller 105, a buffer 110, a mapping unit 115, and a display 120.

Controller 105 receives a stream of input data and stores it in buffer 110. In the description of this and other embodiments, it will be assumed that the stream of input data comprises pairs of minimum and maximum values ("min/max pairs") obtained in measurements over corresponding measurement intervals. However, the stream of input data could alternatively comprise only single measurements. In this alternative situation, system 100 can convert each measurement to a min/max pair and produce additional data as desired.

Controller 105 also monitors the data stored in buffer 110 and controls operations for managing the stored data, such as any buffer compression that may be required in the event that buffer 110 becomes completely full. Controller 105 can be implemented by a processing component such as a microprocessor, custom hardware, or any other set of components capable of performing its designated functions.

Buffer 110 stores the stream of input data and provides it to mapping unit 115. Buffer 110 is typically implemented by a dedicated block of memory within system 100. Buffer 110 has a storage capacity that is larger than the number of data elements that can be displayed at one time on display 120. For instance, buffer 110 may store a number of data elements that is multiple times a pixel width of display 120. In general, buffer 110 can be any size, but adopting a size equal to an integer multiple of the pixel width of display 120 can simplify the processing and display of the stored data, as will be apparent from the description below. A larger buffer can potentially allow more linear display of the stored data, although the buffer size may become a computational burden if too large.

In the event that buffer 110 becomes completely full, controller 105 compresses or reduces the stored data into a portion of buffer 110. For example, it may compress the data by combining pairs of adjacent data elements into a single data element and storing the resulting data in half of buffer 110. In this example, the compressed data is considered to have a compression factor (Or compression ratio) of two because two data elements are used to produce each element of compressed data. The compression allows buffer 110 to continue storing new data elements for the trend graph presented on display 120.

Once buffer 110 has been compressed, a resulting new compression factor is remembered. New incoming data is compressed by the same factor, matching the compression of the data in the buffer. The data elements may be placed in the buffer as they arrive but that location in buffer 110 will include a number of compressed elements before any new data is placed in a next buffer location. Placing a new data element in buffer 110 upon arrival allows the graph to reflect the new data element immediately rather than waiting for all of the elements which will be combined into the same buffer location.

Mapping unit 115 maps the data stored in buffer 110 onto pixel coordinates of display 120 where it is drawn as a trend graph. In addition, mapping unit 115 typically comprises software or hardware designed to implement a selected mapping method.

The manner of drawing data elements across the trend graph is generally influenced by whether the number of data elements in buffer 110 is greater than the number of pixel columns in the trend graph, i.e., the pixel width. In other words, different mapping or drawing techniques can be employed according to two different scenarios.

In a first scenario, the number of data elements in buffer 110 is less than or equal to the pixel width. Under this scenario, the data elements can be plotted left aligned, right aligned, or spread proportionally across the graph.

In a second scenario, the number of data elements in buffer 110 exceeds the pixels width. Under this scenario, the mapping method performs compression or reduction of the data elements in order to fit into the display area, an operation referred to as "display compression". As an example, if the number of data elements stored in buffer 110 is twice the pixel width, the mapping method may combine two data elements to produce data displayed at one pixel coordinate. The display compression can be accomplished by various alternative methods, as will be apparent from the description of various embodiments below.

Display 120 generates the trend graph based on the data elements provided by mapping unit 115. As controller 105 continues to receive the stream of input data, more information is used to create the trend graph in display 120. As the amount of received data passes the point where the width of the graph is fully utilized, the width of the graph will represent an ever increasing amount of time.

Figure 2:
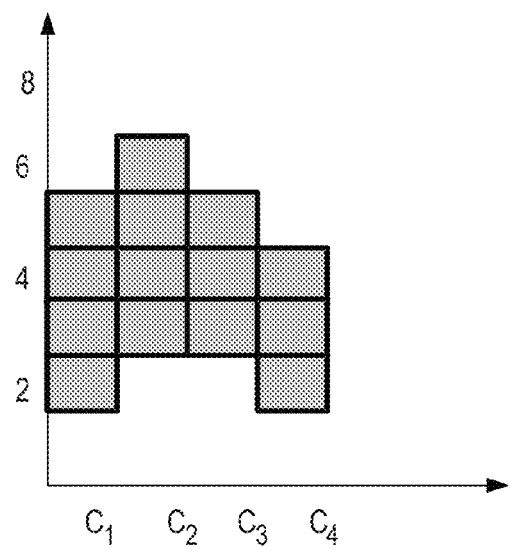
FIG. 2 shows an example of a trend graph that may be produced by the system of FIG. 1 according to a representative embodiment.

FIG. 2 shows an example of a trend graph that may be produced by the system of FIG. 1 according to a representative embodiment.

The embodiment of FIG. 2 uses stored input data comprising pairs of minimum and maximum measurement values corresponding to distinct measurement intervals. For instance, buffer 110 may store a sequence of data elements of the form (a, b), where a represents a smallest measurement value obtained over a corresponding measurement interval and b represents a largest measurement value obtained over the corresponding measurement interval. Each data element is displayed as a vertical bar of pixels between the minimum and maximum value, and different data elements are displayed at locations on the x axis corresponding to their respective measurement intervals. This type of presentation, which can be referred to as a min-max trend graph, is common in DMM and oscilloscope displays and stock market high/low charts, for example. Where multiple data elements are combined by mapping unit 115 a vertical bar is drawn in the trend graph between a smallest minimum value and a largest maximum value among the data elements.

Referring to FIG. 2, display 120 shows a trend graph based on measurement values generated at four measurement intervals. The measurement values form data elements displayed in pixel columns $c_1$, $c_2$, $c_3$ and $c_4$, which correspond to the four measurement intervals. These intervals may correspond to, for instance, discrete periods of time or certain event windows. For explanation purposes, it will be assumed that the trend graph has a pixel width of four, so it can accommodate four data elements. Four distinct data elements are shown on an arbitrary scale ranging from zero to eight units. These data elements may be generated by combining two or more data elements stored in buffer 110.

Although not illustrated in FIG. 2, one aspect of displaying data elements in a trend graph is the scaling of vertical position, e.g., mapping 5.43 Volts onto pixel row 47 on the trend graph, mapping 6.42 Volts onto pixel row 52, and so on. In many display systems, the relevant scaling parameters must be recalculated periodically. However, as wilt be apparent from the following description, certain embodiments can reduce the frequency of this recalculation.

Figure 3:
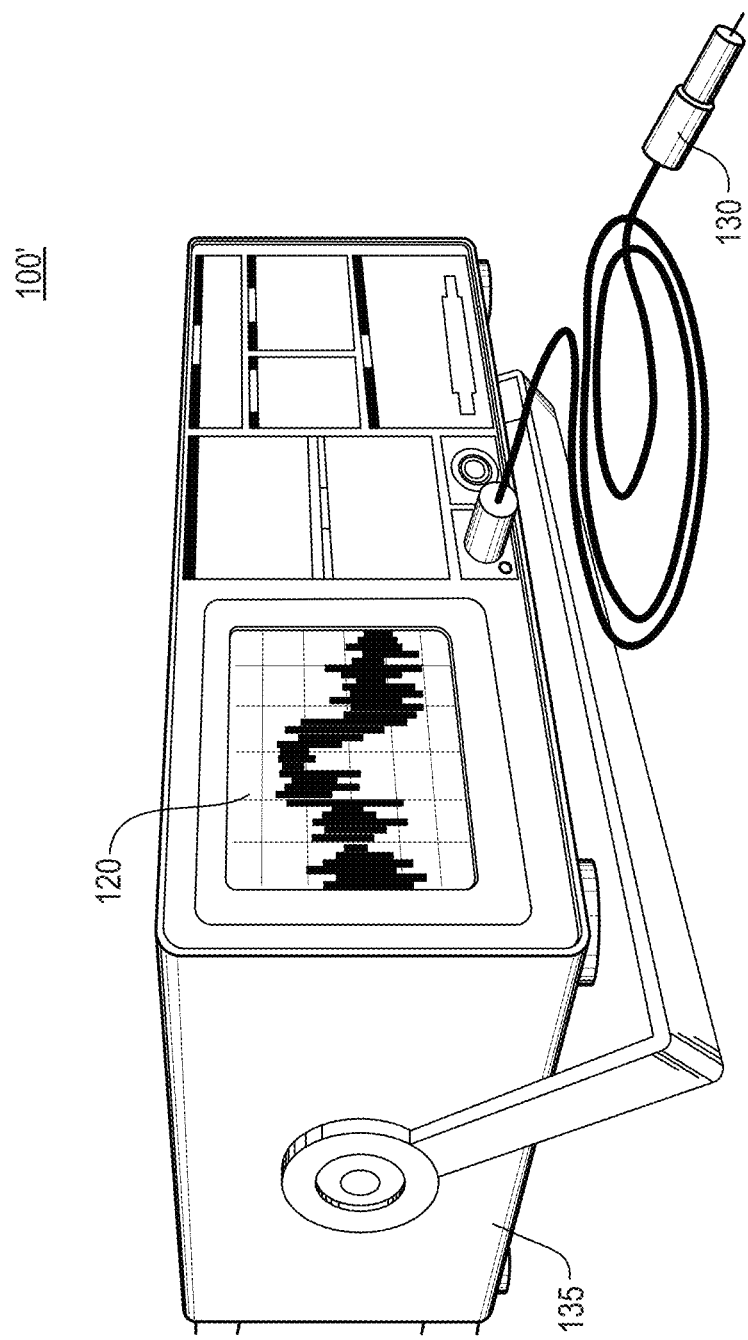
FIG. 3 is a schematic diagram of one potential implementation of the system shown in FIG. 1 according to a representative embodiment.

FIG. 3 is a schematic diagram of one potential implementation of the system shown in FIG. 3 according to a representative embodiment. In this implementation, a system 100' is formed by a combination of a measurement device 135 and a probe 130. Examples of the measurement device include, without limitation, a DMM, a voltmeter, and an oscilloscope.

Referring to FIG. 4, display 120 comprises a plurality of pixel columns each displaying a vertical bar representing a data element. It is assumed each vertical bar has a width of one pixel, although each vertical bar could alternatively have a width of more than one pixel in order to achieve desired display characteristics.

During typical operation, a user applies probe 130 to a test point of a device under test (DUT) in detect a time-varying voltage. Probe 130 transmits the detected voltage to an analog to digital converter (ADC), which converts the voltage into a stream of digital voltage measurements. These measurements are then converted into a stream of min-max values corresponding to successive measurement intervals, and the min-max values are stored as data elements in buffer 110. The stored data elements are then processed for presentation on display 120 as described above in relation to FIGS. 1 and 2.

FIGS. 4A through 4F are conceptual diagrams illustrating methods of generating a trend graph according to representative embodiments. For explanation purposes, it will be assumed that the methods illustrated in FIGS. 4A through 4F are performed by system 100, although they are not limited to any particular system implementation.

Each of FIGS. 4A through 4F comprises a top part that shows the storage of data elements in buffer 110, a middle part that shows the mapping of data elements into a display configuration, and a bottom part that illustrates the display elements in a min-max trend graph. Each of the data elements comprises a minimum and maximum value captured during a corresponding measurement interval. The minimum and maximum values are denoted (a, b) and the measurement intervals are labeled i1 through i8. Data elements are displayed in four pixel columns labeled c1 through c4 measurement.

In FIGS. 4A through 4F, buffer 110 is shown with a size B of eight data elements (B=8), and the trend graph is shown with a pixel width P of four data elements (P=4). However, most practical implementations will include significantly larger buffer and display capacity.

Figure 4A:
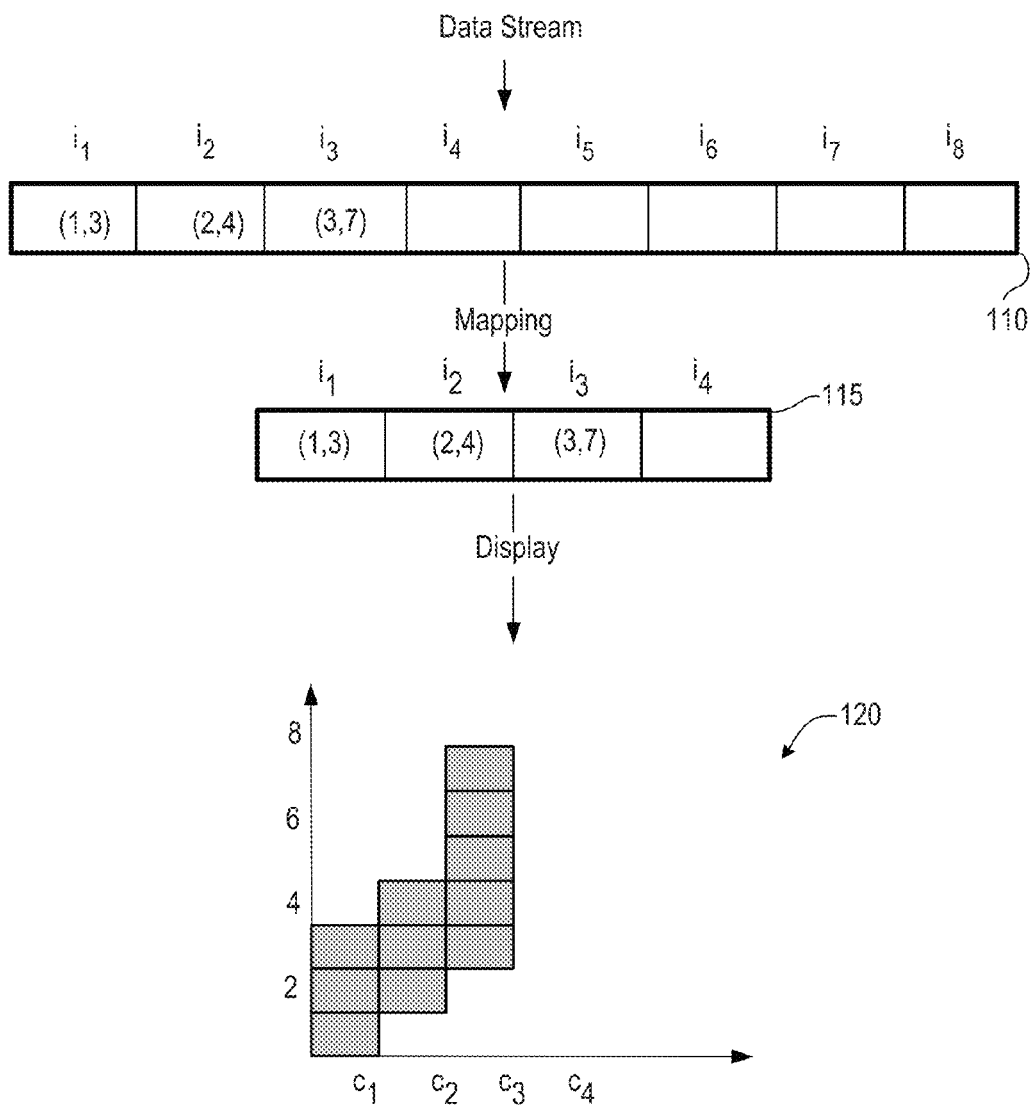
FIGS. 4A through 4F are conceptual diagrams illustrating methods of generating a trend graph according to representative embodiments.

Referring to FIG. 4A, buffer 110 stores three data elements (1, 3), (2, 4), and (3, 7). The number of data elements in buffer 110 is smaller than the width of display 120, so there is no need to perform compression or data reduction in the mapping operation. The three data elements are shown in a left justified position in display 120, although they could alternatively be right justified or spread out to fill the entire width of display 120.

Figure 4B:
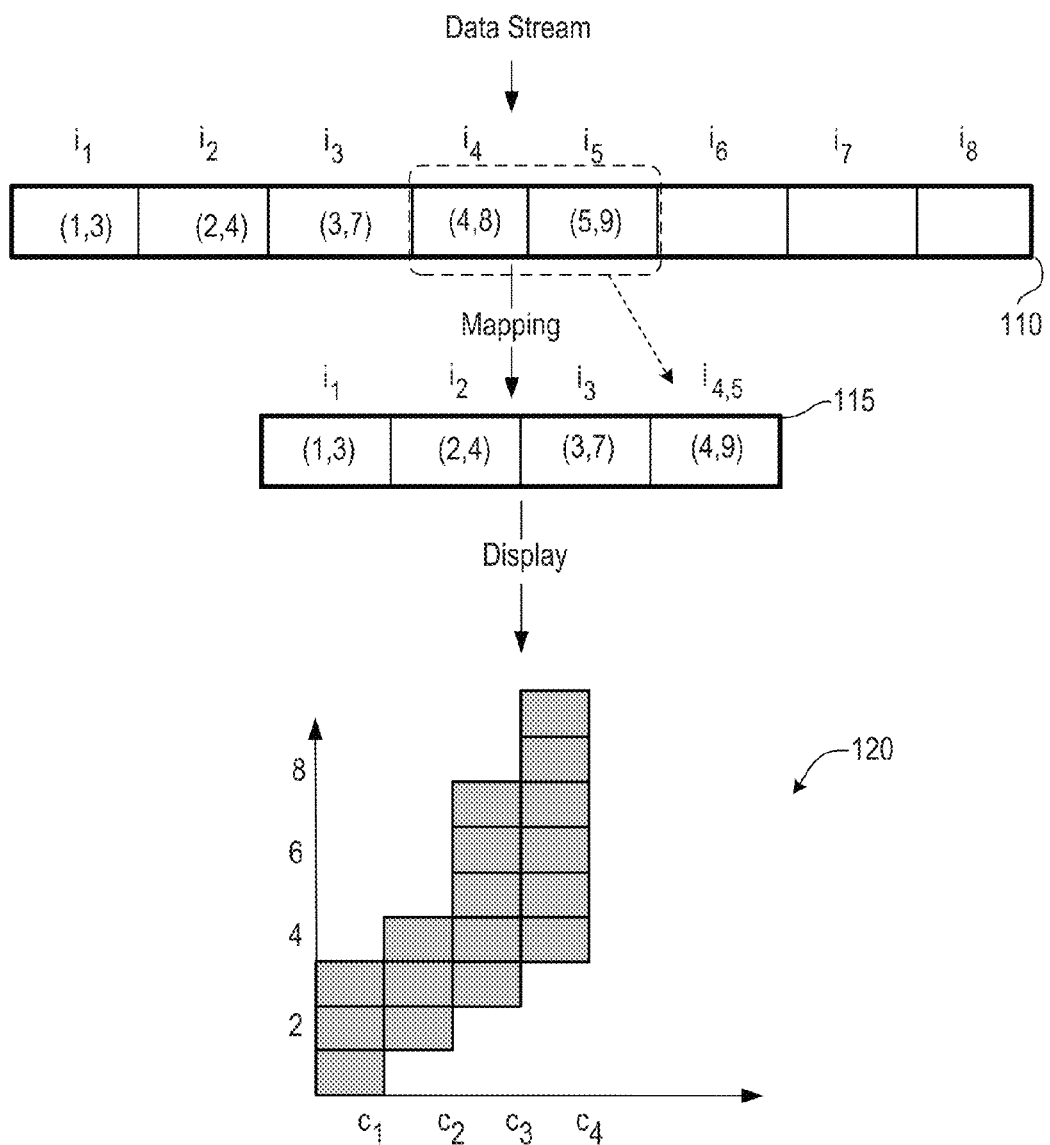

Referring to FIG. 4B, buffer 110 stores five data elements (1, 3), (2, 4), (3, 7), (4, 8), and (5, 9). The number of data elements in buffer 110 is larger than the width of display 120, so mapping unit 115 compresses two data elements (4, 8) and (5, 9) into a single combined data element (4, 9) corresponding to an interval $i_{4,5}$ and shown in column $c_4$ of display 120. Because interval $i_{4,5}$ is populated by more than one data element, it is considered to have an "extra" data element, while other intervals (or display columns) are considered to have a normal number of data elements. The data element (4, 9) is formed by the minimum and maximum values among the original data elements. Alternatively, other methods could be used to compress, combine, or reduce multiple data elements into a single combined data element.

Figure 4C:
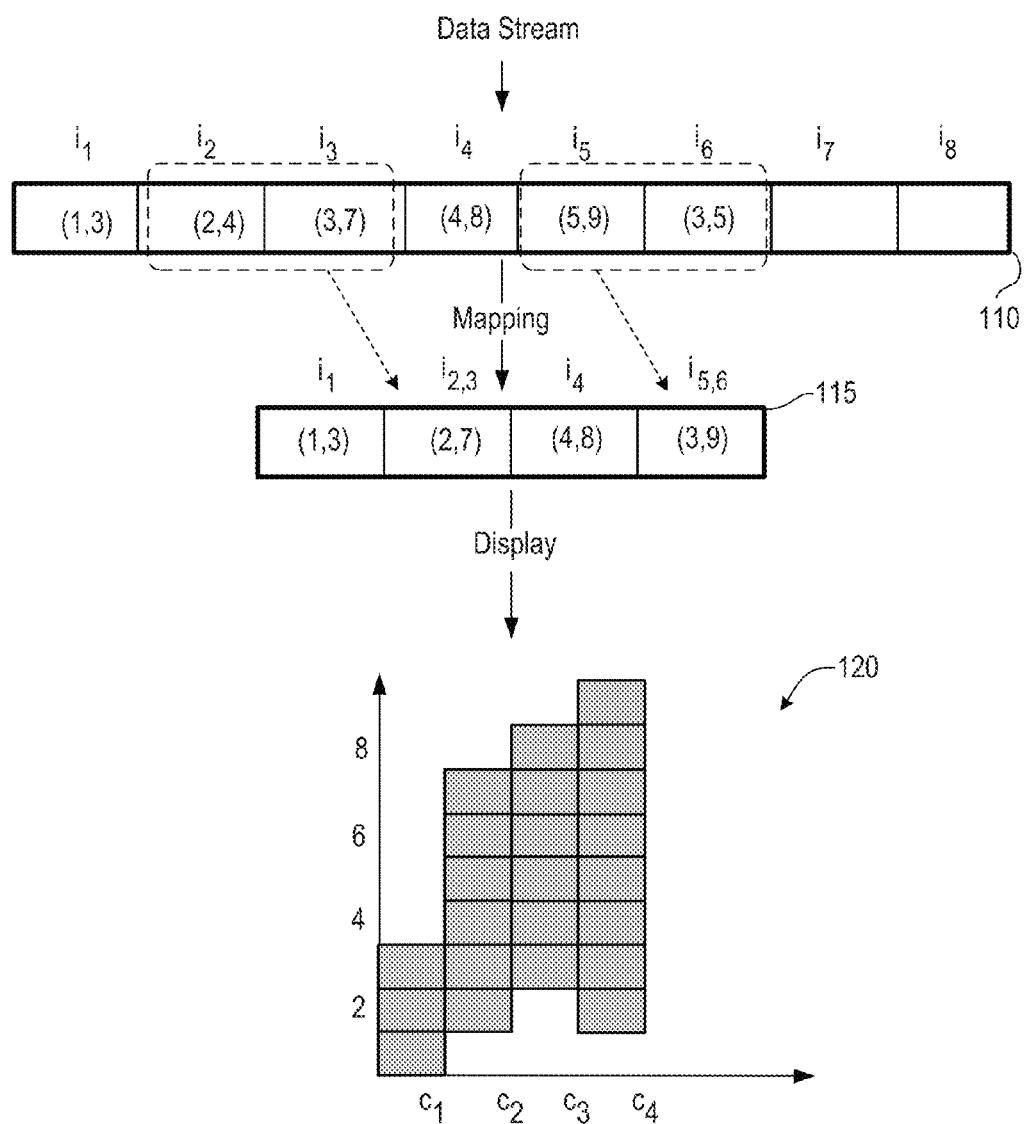

In the example of FIG. 4B, there is only one combined data element to be displayed in display 120, and this data element is formed by the last two data elements in buffer 110. The determination to combine the last two data elements has relatively minor impact on the overall appearance of the resulting trend graph due to the fact that there is only one combined data element. However, where more than one combined data element is to be shown in display 120, the combined data elements may be formed from data elements that are spread out across buffer 110. In other words, display columns with "extra" data elements may be spread out across display 120. A simple example of forming combined data elements from data elements that are spread out across buffer 110 is shown in FIG. 4C.

Referring to 4C, buffer 110 stores six data elements (1, 3), (2, 4), (3, 7), (4, 8), (5, 9), and (3, 5). There are two more data elements in buffer 110 than there are display intervals in display 120. Accordingly, two different pairs of data elements are combined for presentation on display 120. The two different pairs of data elements are selected from locations that are spread out from each other in buffer 110 in order to avoid skewing one portion of the trend graph. In particular, data elements (2, 4) and (3, 7) are combined to produce a data element (2, 7) for an interval $i_{2,3}$, and data elements (5, 9) and (3, 5) are combined to produce a data element for an interval $i_{5,6}$. In general, there are many different ways to select which data elements are combined to form the trend graph.

Figure 4D:
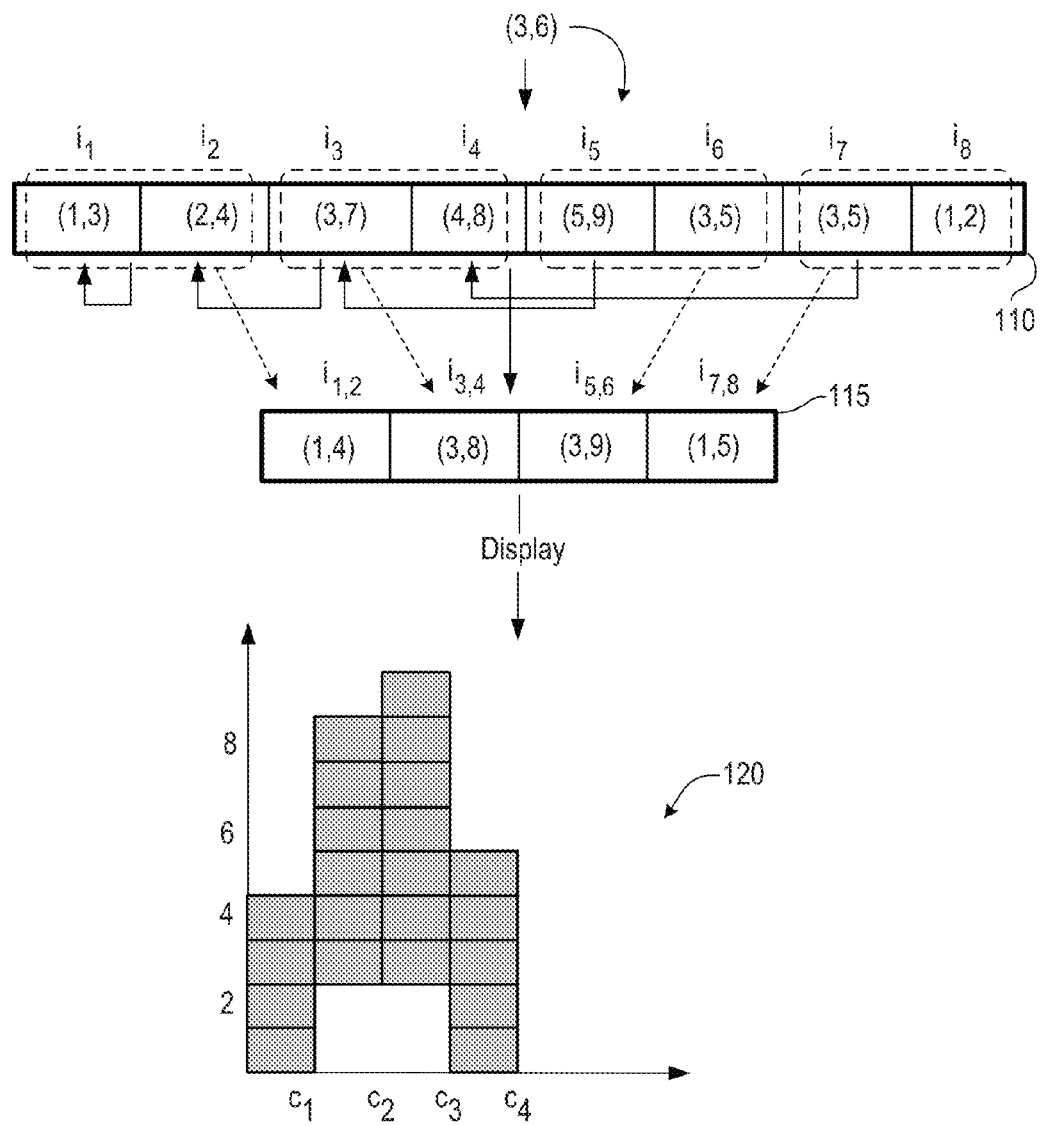

Referring to FIG. 4D, buffer 110 stores eight data elements (1, 3), (2, 4), (3, 7), (4, 8), (5, 9), (3, 5), (3, 5), and (1, 2). In addition, a next data element (3, 6) among the data stream is waiting to be stored in buffer 110. Because buffer 110 is full, its data must be compressed or reduced to make room for data element (3, 6). Accordingly, the two data elements of intervals and $i_2$ are combined and stored as a first entry in buffer 110, as indicated by a corresponding rectilinear arrow. Similarly, the two data elements of intervals $i_3$ and $i_4$ are combined and stored as a second entry in buffer 110, the two data elements of intervals $i_5$ and $i_6$ are combined and stored as a third entry in buffer 110, and the two data elements of intervals $i_7$ and $i_8$ are combined and stored as a fourth entry in buffer 110, as indicated by corresponding rectilinear arrows. Finally, the next data element (3, 6) is stored as a fifth entry in buffer 110, as indicated by a curved arrow.

Figure 4E:
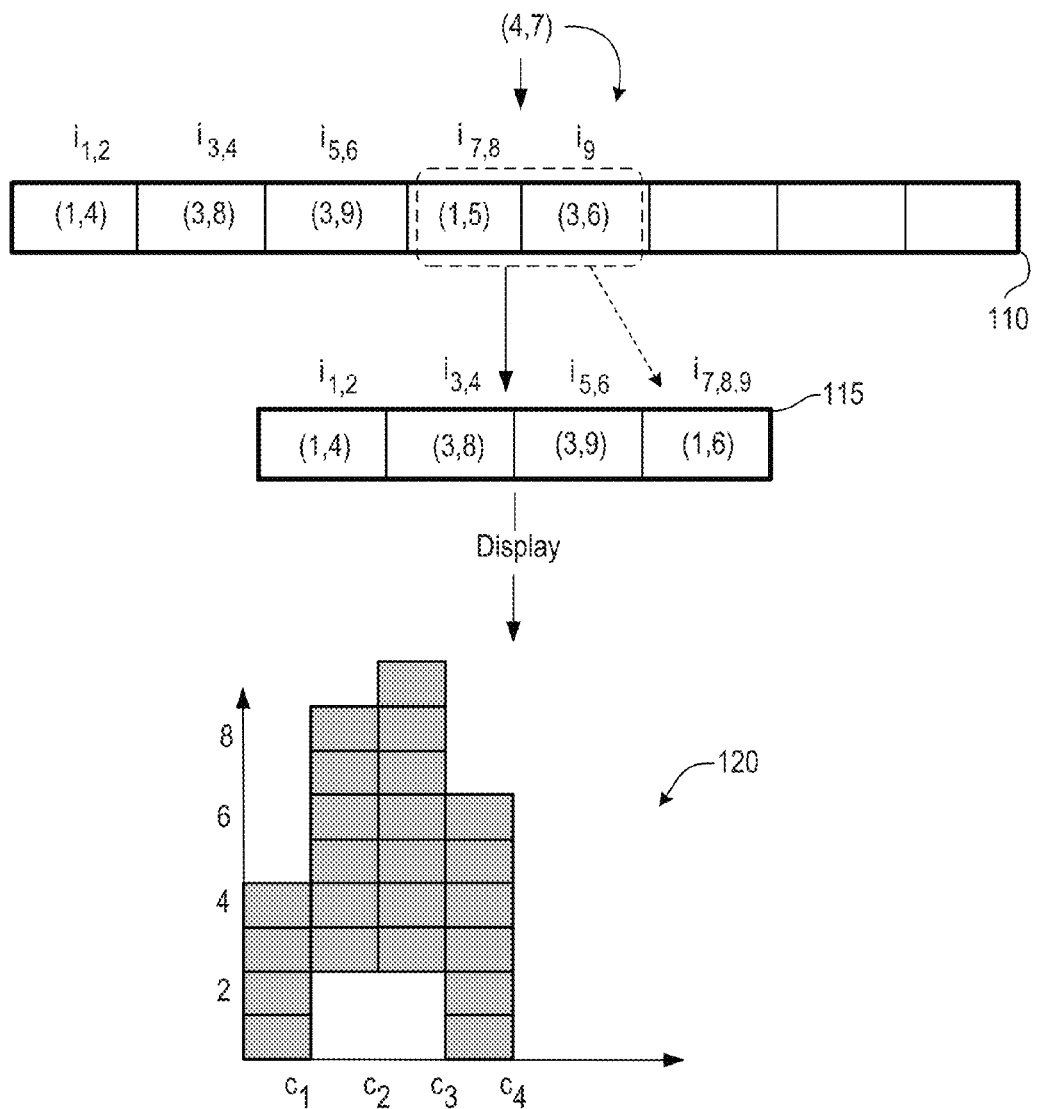
Figure 4F:
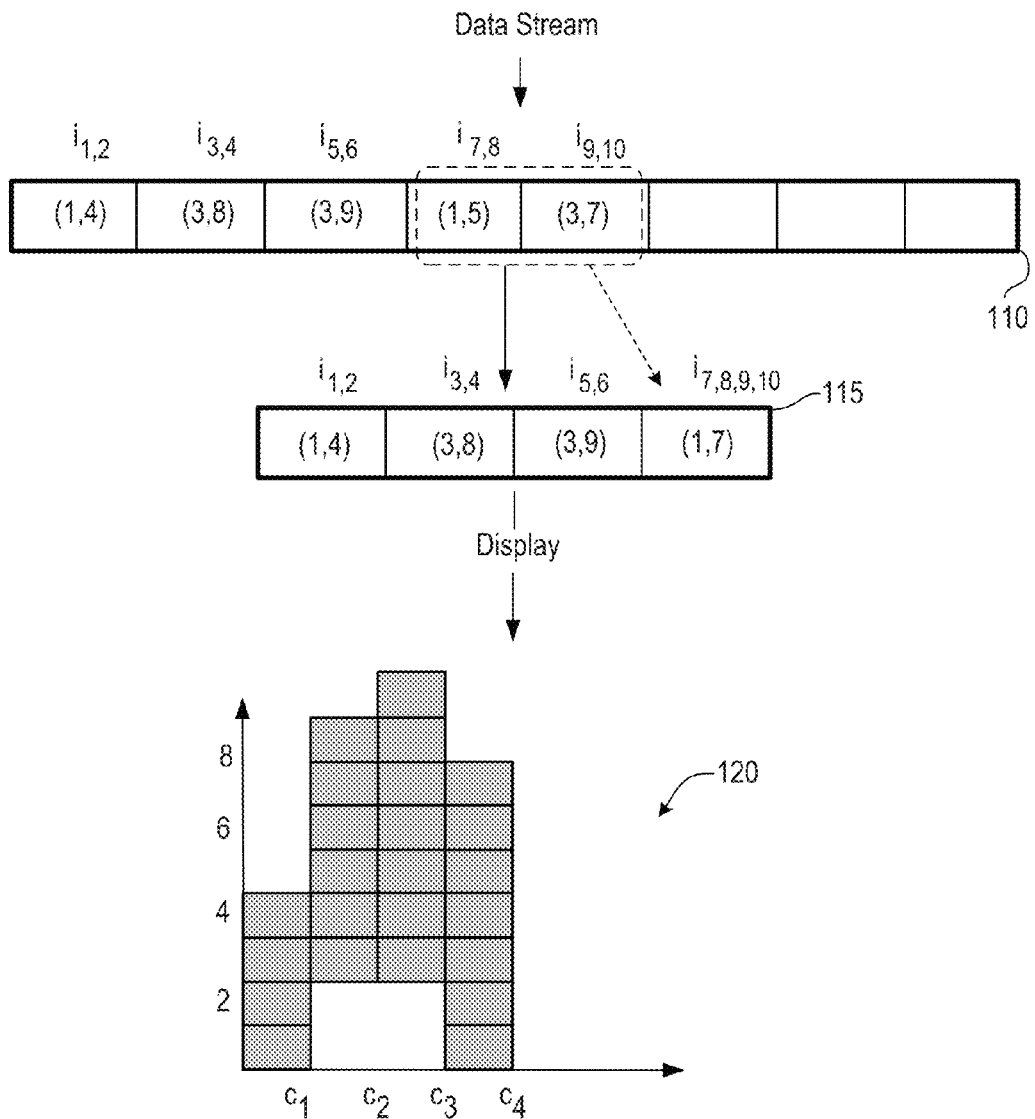

Referring to FIG. 4E, the contents of buffer 110 are shown after the compression procedure of FIG. 4D. Following the compression procedure, buffer 110 has a compression factor of two because its entries are formed by combining two data elements. The most recent buffer entry (3, 6), which corresponds to interval $i_9$, is stored without compression and is subsequently combined with a next data element (4, 7) to form a data element (3, 7) as illustrated in FIG. 4F, according to the buffer compression factor of two. This combining of incoming data elements according to the compression ratio of buffer 110 may be referred to as "incoming compression" to distinguish it from "buffer compression" or "display compression".

Each subsequent filling of buffer 110 will result in another buffer compression, ad infinitum. As subsequent buffer compression is performed, the compression factor of buffer 110 will increase.

The buffer compression is permanent, not allowing later separation of combined data elements. In a typical implementation, the contents of buffer 110 are compressed by an integer ratio, of which the two to one ratio of FIGS. 4D and 4F is merely one example. This may be done for simplicity of implementation and computation time, and to maintain a linear relationship among the data elements. Such an integer ratio can make the compression in buffer 110 an exact reflection of the compression occurring in the trend graph. The compression does not necessarily reduce the data in buffer 110 to be the same as the display width (e.g., pixel width), as will become more apparent from the description below.

As each compression of buffer 110 occurs, system 100 will keep track of the compression factor. For example, controller 105 may store and update the compression factor. Subsequent incoming data will be compacted at the same ratio as it is placed into buffer 110. However, system 100 does not wait until all of the data elements to be combined in a buffer location have arrived before displaying them on the trend graph, as illustrated, for instance, by the example of FIG. 4D. The first data element contributing to a buffer location will be added to the buffer immediately and the data will be displayed in the graph when drawn. As each subsequent data element arrives it is compressed with other data elements in that buffer location. This compression is typically performed by an incoming compression technique such as that illustrated in FIG. 4F, in which overall maximum and minimum values of the combined data elements are stored at the buffer location.

As illustrated by the examples of FIGS. 4A through 4F, where the ratio of the size B of buffer 110 to the pixel width P of display 120 is 2 (B=2P), each display unit (e.g., pixel) will represent either one or two data elements. Where B is far greater than 2P, say B=8P, each pixel column will contain either 4 or 5 data elements immediately after buffer compression and either 7 or 8 data elements as the buffer nears full. Having a larger buffer size therefore reduces the nonlinearity inherent in the distribution of data points across a different number of display intervals.

Figure 5:
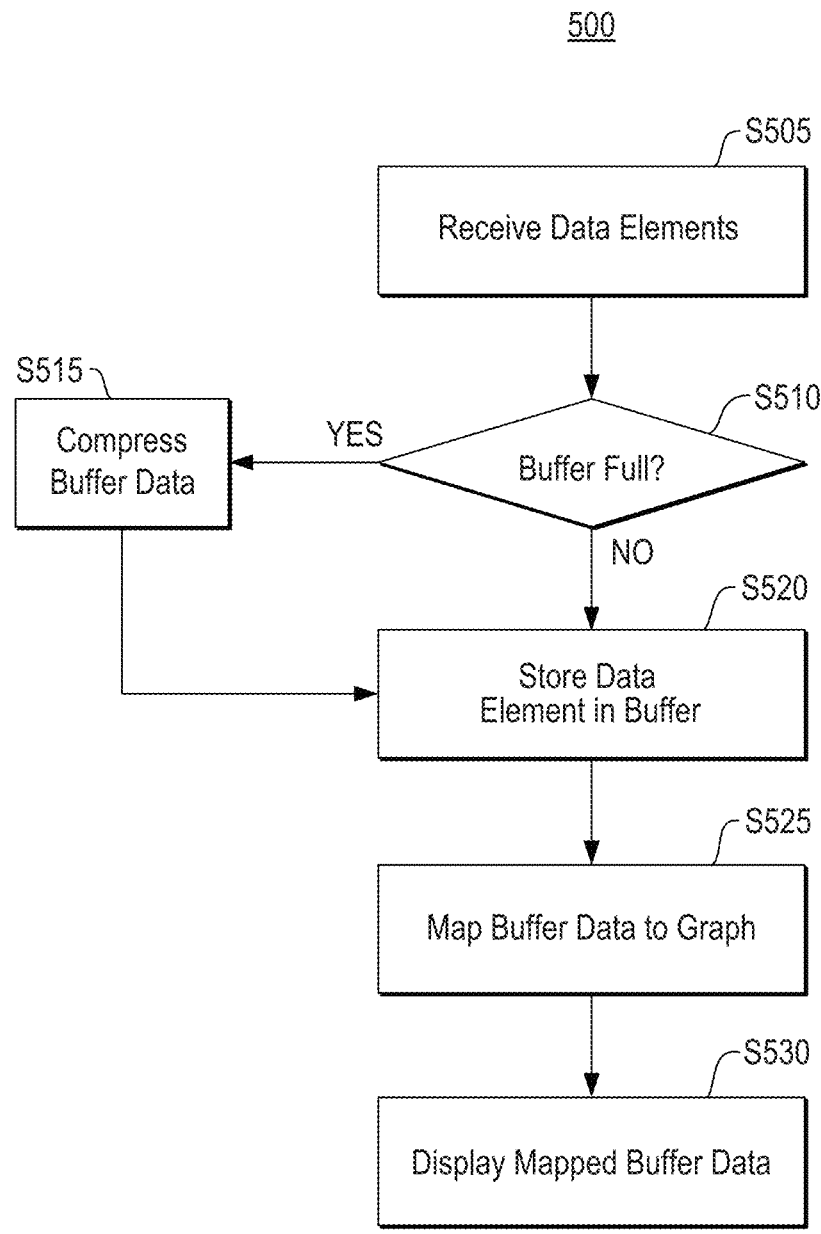
FIG. 5 is a flowchart illustrating a method of generating a trend graph according to a representative embodiment.

FIG. 5 is a flowchart illustrating a method 500 of generating a trend graph according to a representative embodiment. This method may be performed, for instance, by system 100 of FIG. 1, although it is not necessarily limited to any particular system configuration. In the description that follows, example method features will be indicated by parentheses to distinguish them from example device or system features.

Referring to FIG. 5, method 500 begins by receiving a data element (S505). Next, the method determines whether the data buffer is full (S510). Upon determining that the data buffer is hill (S510=YES), data elements stored in the data buffer are compressed (S515). Otherwise (S510=NO), the method proceeds to operation S520. The compression can be performed by any suitable compression method, with one example being the method shown in FIGS. 4D and 4E. Next, the method stores the data element in a data buffer (S520). This can be performed, for instance, by controller 105 placing data elements in butler 110. Where the compression factor of buffer 110 is greater than one, incoming compression may be performed in conjunction with operation S520, as illustrated, for instance, in FIGS. 4E and 4F.

Subsequently, the data elements stored in the data buffer are mapped onto a trend graph (S525). This mapping can be performed, for example, by combining multiple data elements from the data buffer to produce a single combined data element, and mapping the combined data element onto a corresponding location on a display. A few simple examples of operation S525 include the mapping operations shown in FIGS. 4A through 4F. Finally, the mapped data elements are presented as a trend graph in the display (S530). The trend graph may take a form such as that illustrated in FIG. 2, for example.

As a variation of the method of FIG. 5, buffer compression can be performed in response to some event other than detection that the data buffer is full. For example, compression may be performed upon determining that the data buffer is filled beyond a predetermined threshold, in response to an external input, or in response to any of several other possible events.

Figure 6A:
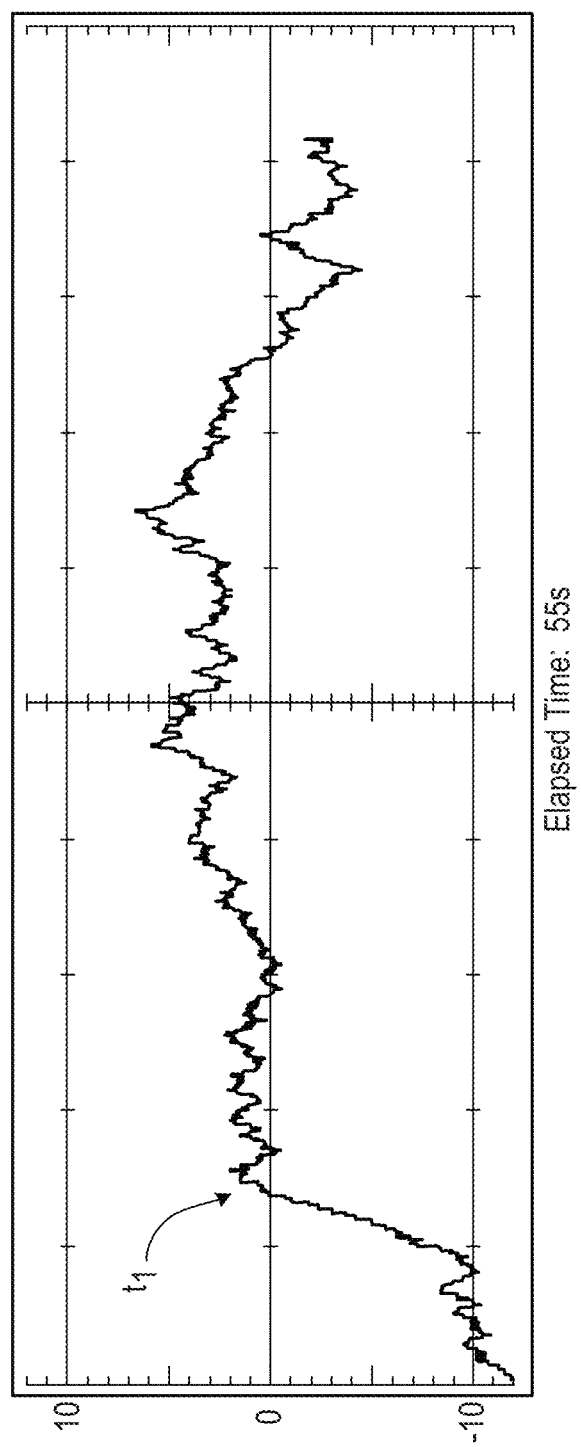
FIGS. 6A through 6C are trend graphs generated at successive times and with increasing compression according to a representative embodiment.
Figure 6B:
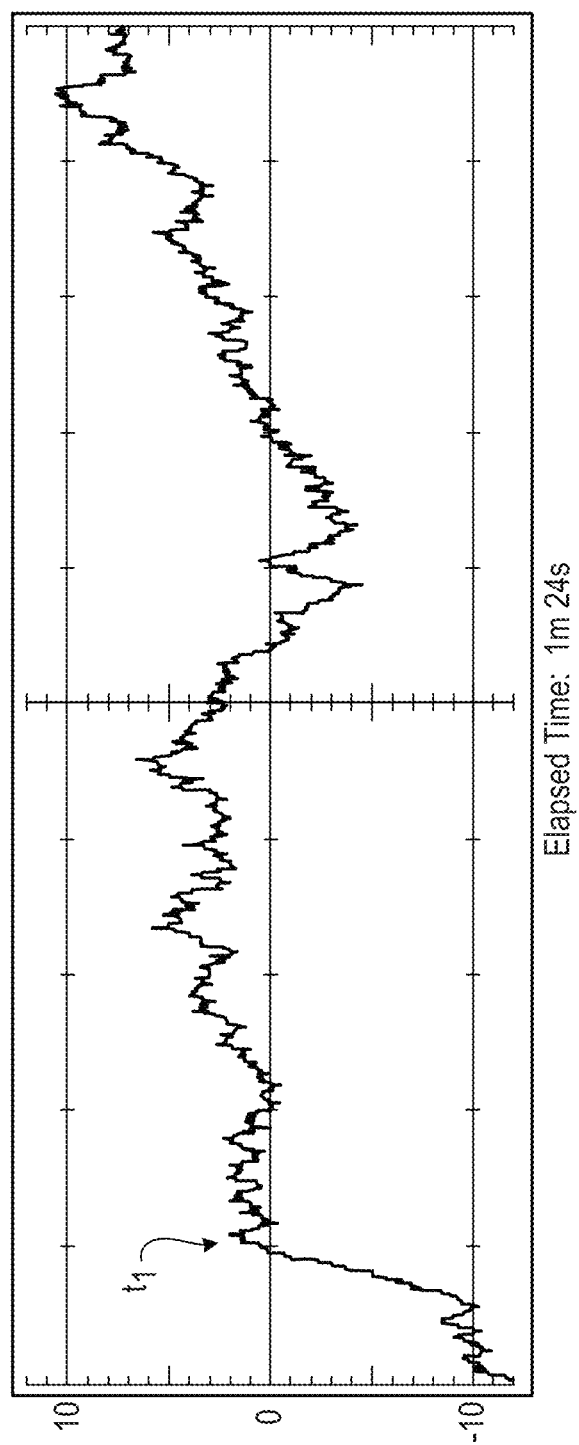
Figure 6C:
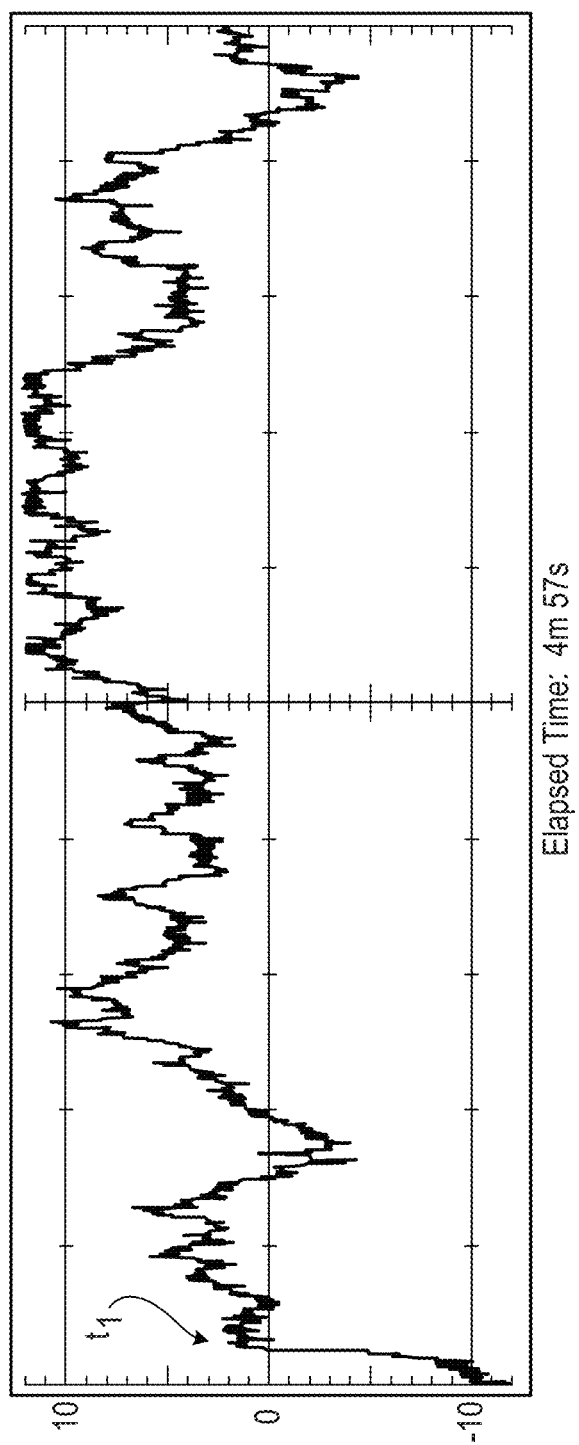

FIGS. 6A through 6C are trend graphs generated at successive times and with increasing compression according to a representative embodiment. These trend graphs were generated from a sequence of measured voltages output by DMM over a five minute period. For explanation purposes, it will be assumed that B=2P. It will also be assumed that during each one minute interval, the number of data elements received by the DMM is substantially equal to the pixel width of the DMM display.

The graph of FIG. 6A was generated without any sort of compression at a time of 55 seconds. The lack of compression is evidenced by the fact that the whole width of the graph is not being used and the displayed data is left justified. The graph of FIG. 6B was generated with display compression at a time of 1 minute and 24 seconds. This display compression is performed because the number of data elements stored in a data buffer of the DMM is greater than the number of pixel columns in the display. However, no buffer compression has been performed because the data buffer capacity has not been reached. Finally, the graph of FIG. 6C was generated at a time of 4 minutes and 57 with buffer compression using a compression factor of four. Because B=2P in this example, then the data buffer can only hold two minutes of data elements. Accordingly, at 4 minutes and 57 seconds, two buffer compressions have been performed—one at two minutes and one at four. However, in general, the amount of buffer compression depends on the size of the data buffer, so if the data buffer were larger, e.g., B=8P then no buffer compression would have been required before 4 minutes and 57 seconds.

For comparison purposes, each of FIGS. 6A through 6C includes a reference arrow indicating the location of measurement data obtained at a time t1. As the compression factor increases, the reference arrow moves toward the left side of the trend graph. In other words, data is dynamically shifted toward the left side of the trend graph to accommodate new data.

Figure 7:
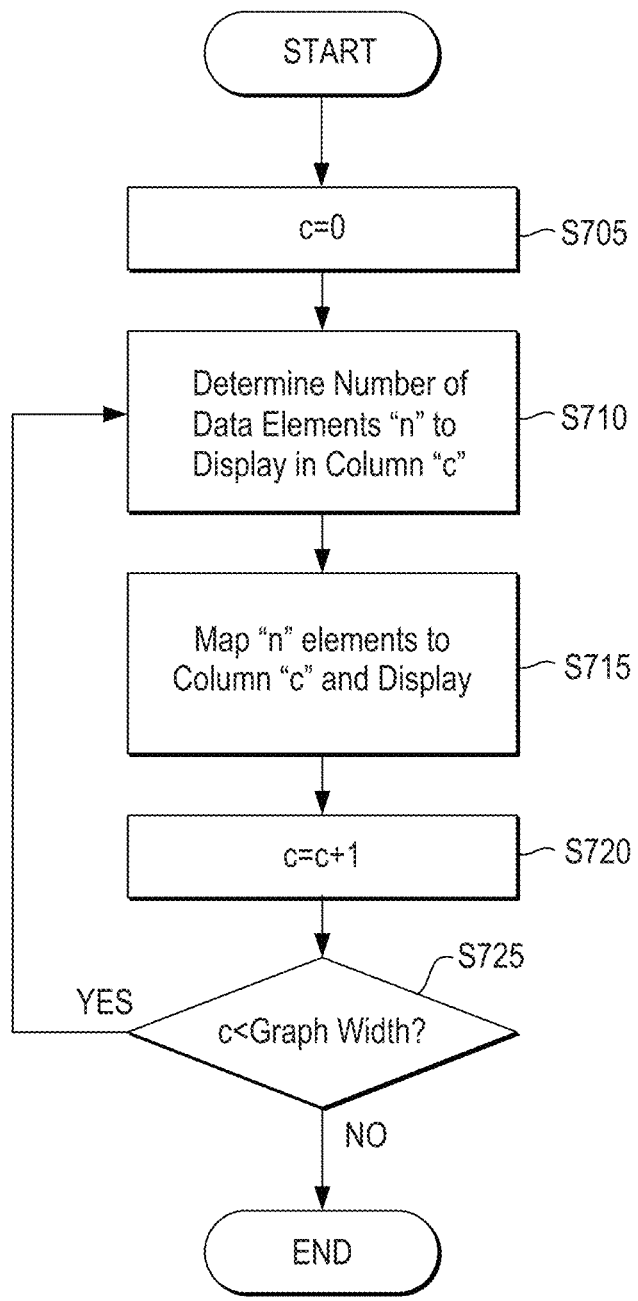
FIG. 7 is a flowchart illustrating a method of mapping data elements from a data buffer to display columns of a display according to a representative embodiment.

FIG. 7 is a flowchart illustrating a method 700 of mapping data elements from a data buffer to display columns (e.g., pixel columns) of a display according to a representative embodiment. In some embodiments, the method of FIG. 7 could be performed by system 100 to implement one or more operations in the method of FIG. 5, for example.

In the method of FIG. 7, display columns with "extra" data elements are spread substantially evenly across a trend graph. Accordingly, each time one or more new data elements are to be added to the trend graph, the respective positions of the "extra" data elements are recalculated. The recalculation of these locations is shown in FIG. 7 as a loop that repeats itself for each display column in the display.

At any point in the method of FIG. 7, each pixel column will contain either n=q or n=q+1 data elements. For example, suppose the pixel width P of display 120 is 100, the size B of buffer 110 is 800, and the current number of data elements E in buffer 110 is 543 at the time of drawing. Each pixel column will contain either 5 or 6 data elements (q=floor(E/P)=5). There will be 43 (E modulo P) pixel columns representing 6 data elements, and 100−43=57 with 5 data elements (43×6+ 57×5=543). The different methods described below differ in the manner in which the columns having extra (q+1) data elements are distributed across the trend graph.

Referring to FIG. 7, method 700 begins by initializing an index c, which corresponds to a column number (S705). Next, the method 700 determines the number n of data elements to be used to produce a combined data element for column c (S710). In general, this determination depends on the number of data elements E in the data buffer, the size B of the data buffer, and the number of display columns P in the display. Further details of how this determination is made in operation S710 are described below. Once the number n has been determined, the method 700 maps n data elements in the data buffer onto column c of the display (S715).

Next, the index c is incremented (S720) and method 700 determines whether index c is less than the width of the trend graph (S725). In other words, it determines whether data elements have been mapped to all of the columns in the trend graph. If not (S725=YES), the method 700 returns to operation S710. Otherwise (S725=NO), the method 700 ends.

Within method 700, operation S710 is typically performed by a technique using an accumulator and an addend. Due to the use of these components, the method 700 may be referred to as a residue accumulation method. The accumulator and addend each represent a number of elements and can be implemented as a binary integer wherein lower k digits correspond to a fractional portion and the remaining upper digits correspond to a whole portion. When adding two such values together, a carry sum from the fractional portion into the whole portion represents a single element.

The addend is computed by taking the number of elements E in the data buffer multiplied by $2^k$ (usually done as a shift to the left of k digits) and dividing by the number P of display columns in the graph. Hence the addend represents an average number of data elements per display column.

The accumulator is generally given an initial value of zero. During a sweep, for each display column the addend is added to the accumulator, the whole portion of the accumulator is then extracted (typically by taking the accumulator value shifted right by k digits). This value indicates a number of elements from the buffer that will be represented by column c in the display. The whole portion of the accumulator is then cleared (typically by masking the accumulator with the value $2^k-1$). The process is continued for each column c until method 700 is completed.

The number of bits in k, which is used for the fractional part, is selected to ensure that any round-off in the least digit of the addend will not propagate to the whole portion of the accumulator before the end of the sweep. Therefore k is typically chosen such that $2^k>P$. The number of bits in the whole portion needs only be sufficient to cover the maximum number of elements which can be placed in a display column (e.g., ceiling (B/P)).

The actual distribution of the extra data elements among the data columns, e.g. which pixels have n data elements and which have n+1 data elements, is arbitrary but completely controllable by the method. It is typically done by computing an initial value for the residue accumulator. An initial residue of zero will result in the occurrence of the first element that has n+1 data elements being the furthest possible to the right. Similarly, an initial residue can be calculated such that the rightmost display column always contains an "extra" element.

One potential benefit of this method is that the display columns containing "extra" elements are distributed as evenly as possible across the graph, preserving the apparent linearity of the graph. It may also provide a benefit of being fairly simple yet readily handling all values of E and P.

A potential drawback of this method is that as each data element is added to the data buffer and subsequently drawn, the combining of data elements changes. That is, data elements that were represented together in a single display column at one draw will not necessarily be together in a draw subsequent to more data being in the buffer. Visually, this may result in a shimmering effect across the waveform as the pairing varies. It can also prevent certain optimizations from being used, such as some that may be available in the method described below in relation to FIGS. 8A through 8F.

FIGS. 8A through 8F are various diagrams illustrating a method 800 of mapping data elements from a data buffer to display columns of a display according to another representative embodiment. Like the method of FIG. 7, the method of FIGS. 8A through 8F could be used to implement one or more operations in the methods of FIG. 5, for example. For explanation purposes, it will be assumed that the method of FIGS. 8A through 8F is performed by system 100. It will also be assumed that the size of buffer 110 is twice the column width of display 120 (i.e., B=2P) and that display compression is performed by combining pairs of data elements. However, other buffer dimensions and/or display dimensions and/or data element groupings could be used in alternative embodiments.

Figure 8A:
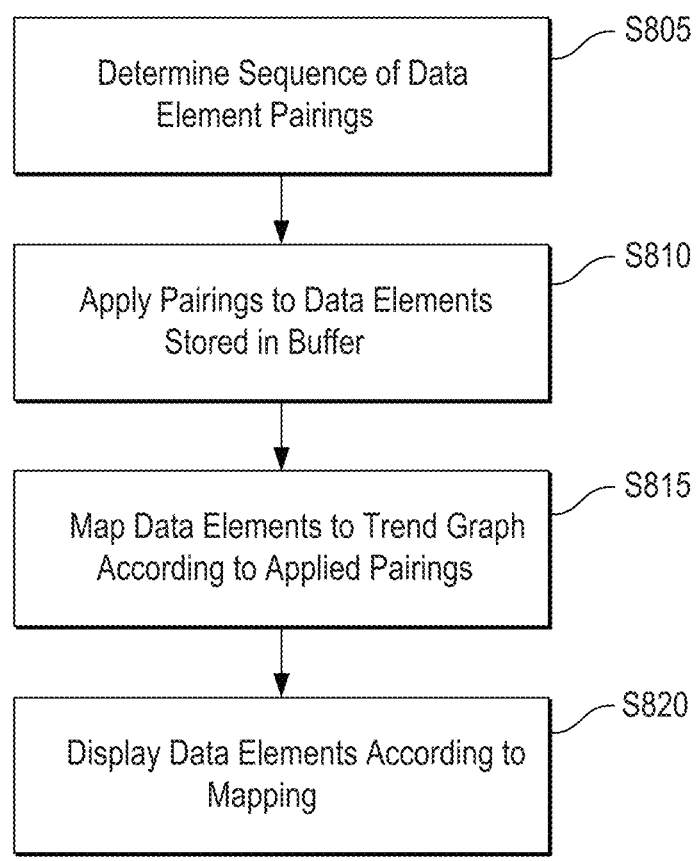
FIGS. 8A through 8F are various diagrams illustrating a method of mapping data elements from a data buffer to display columns of a display according to another representative embodiment.

Referring to FIG. 8A, method 800 begins by determining a sequence of data element pairings (S805). Examples of data element pairings are indicated by dotted boxes in FIGS. 8B through 8F.

Figure 8B:
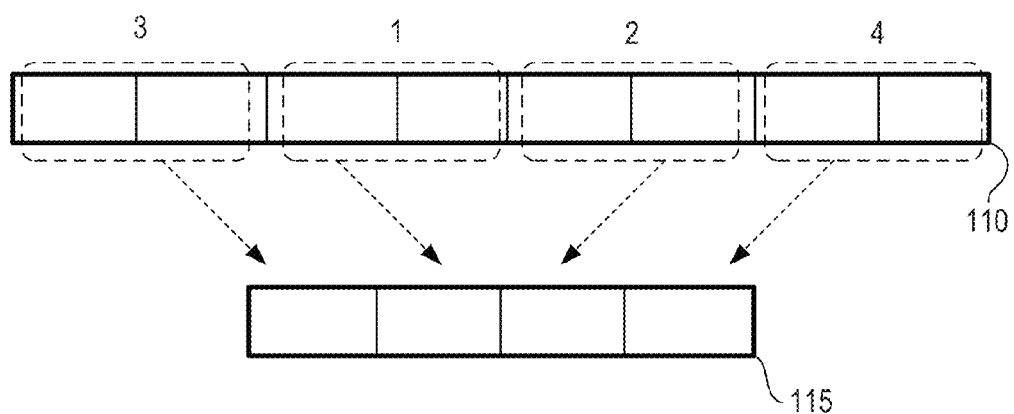

A "sequence" of data element pairings refers to the order in which data element pairings are applied to incoming data as it fills buffer 110. For example, FIG. 8B shows a predetermined sequence of data element pairs, labeled 1, 2, 3, 4. Based on this sequence, as new data elements arrive in buffer 110, a pairing labeled "1" is applied to a corresponding pair of data elements before a pairing labeled "2" is applied to a corresponding pair of data elements, and so on. Accordingly, once the sequence of data element pairings is determined in operation S805, the sequence is subsequently applied to a current set of data elements stored in buffer 110 (S810).

Figure 8C:
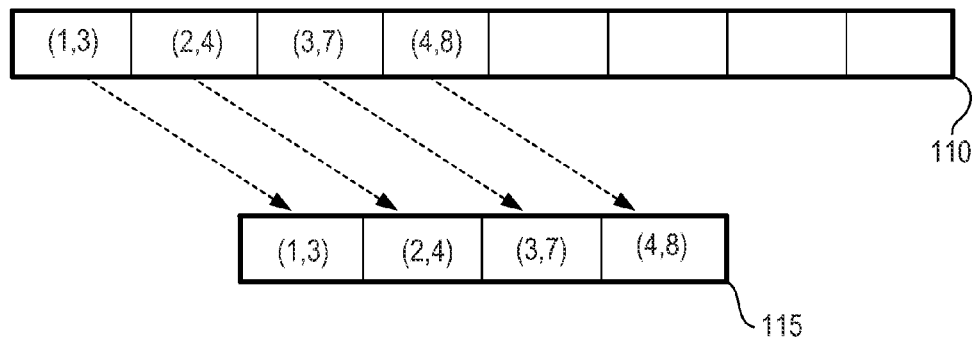
Figure 8D:
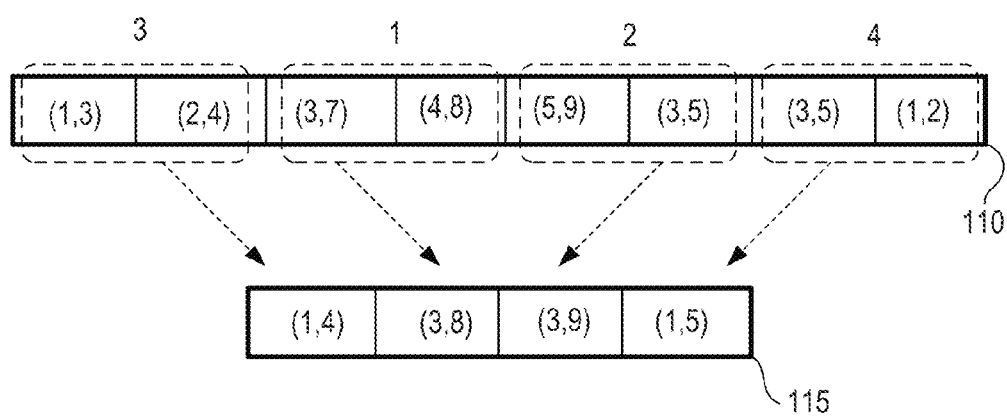
Figure 8E:
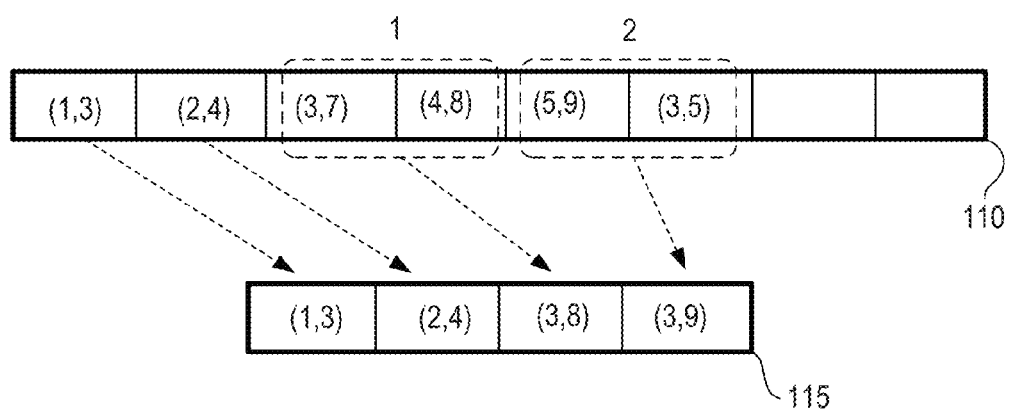

FIGS. 8C through 8E show examples of applying the sequence illustrated in FIG. 8B to data elements stored in buffer 110 at different times. In particular, FIG. 8C shows the sequence as applied where the number of data elements in buffer 110 is less than or equal to the number P of display columns in display 120. In this case, mapping unit 115 maps each data element to one display column. FIG. 8D shows the sequence as applied where E equals the size B of buffer 110, which is 2P. In this case, all four data element pairings are used to map data elements to display 120. FIG. 8E shows the sequence as applied where E is greater than P but less than B. In this case, only two pairings are used to map the data elements in buffer 110 to display 120.

After the sequence of data element pairings is applied to the data elements in buffer 110, the data elements are mapped to the trend graph (S815), and the mapped data elements are then displayed (S820). Subsequently, data stored in buffer 110 is compressed if necessary to accommodate new data, and new data is received via the input data stream. Thereafter, the method returns to operation S810 and a loop between operations S810 and S820 is repeated indefinitely.

As indicated by FIGS. 8B through 8E, a relatively simple implementation of the method 800 of FIG. 8A is to make the size of buffer 110 equal to twice the number of display columns, hence B=2P. Accordingly, at the beginning of data accumulation where E<=P there is no compression required. Where E=P each column of the trend graph will represent one data element, and where E=B=2P each column will represent two elements. Numbering from zero, elements 0 and 1 will be paired, 2 with 3, 4 with 5, etc., combining each even numbered data element with the following odd numbered data element. In other words, where E=B=2P, the pairing is complete and all elements in buffer 110 are shown as paired on display 120.

In general, the effectiveness of the method 800 of FIG. 8A depends on the sequence of data element pairings determined in operation S805. A number of different methods can be used to determine the sequence, as explained below. In each of these methods, the sequence defines pairings that are used to map E data elements onto P display columns for all values of E less than or equal to the buffer size B. The sequence may be such that the pairing of data elements happens when they are not within the E elements to be displayed. In essence, they are planned on being paired whenever those data elements arrive in the input data stream. In such a case those data elements will never appear in the graph in separate columns.

Figure 8F:
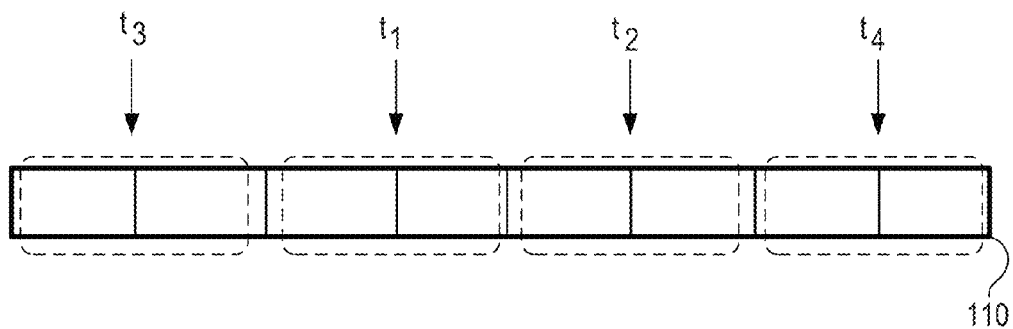

In one example implementation, there are tags in buffer 110 for each of the even numbered data elements. An example of such an implementation is shown in FIG. 8F, where tags t1 through t4 indicate the order and location of tagging data elements in buffer 110. Where E=P and all E data elements are being drawn separately in the P display columns (as when the buffer data has just been compressed) these tags are cleared. As an additional data element arrives from the data stream and E is increased, the location is calculated for a first pairing. This is used to set the corresponding tag in buffer 110. If this pairing is within the readings previously shown, the new data element can now be displayed in the available space. If the pairing indicted by the sequence is not within the existing data, the tag is still set and more sequence values are generated until the new element does fit on the graph.

This is repeated as each new data element arrives, with additional pairing sequence indices calculated to allow the new data to fit on screen. In some cases the new data element may be paired with the preceding one and in other cases two previous data elements have been paired and the new element is placed in the rightmost display column by itself.

Where an actual "sweep" is performed to draw the tines in each column the method need only make a pass through the buffer, drawing each untagged element alone in the column, or if tagged, combining it with the following element into the column, continuing until all of the E elements have been drawn. This sweep can be performed, for instance, in operation S820 of FIG. 8A.

Once buffer 110 eventually fills and a next arriving data element causes buffer 110 to be permanently compacted, all of the tags are cleared and the resultant configuration of the elements in buffer 110 returns to the state where the method begins anew.

The method 800 of FIG. 8A tends to eliminate the shimmering effect produced by the residue accumulation method. One reason for this benefit is that data elements that are paired together are not displayed individually thereafter. In other words, the method 800 permanently combines the data as the sequence of pairings is applied, thus removing the need to compute combined values on each sweep or where buffer 110 fills.

The following are different methods that can be used to determine the sequence of data element pairings in the method of FIG. 8A. In other words, the following are examples of operation S805.

One example of operation S805 uses a reverse carry binary counter. A reverse carry binary counter operates similar to a regular counter except that an uppermost bit in the counter is incremented with a carry bit going into a next tower bit of the counter. For example, in a 4-bit reverse-carry counter, a resulting sequence of values is 0, 8, 4, 12, 2, 10, 6, 14, 1, 9, 5, 13, 3, 11, 7, 15. This can be implemented either directly as described or simply by using a normal counter and reversing the order of bits when the value is used. Where applied to operation S805, the reverse-carry counter provides the effect that a first pairing falls in the center of the buffer and each subsequent pairing bisects one of the resulting sections. This bisecting is distributed evenly throughout buffer 110.

To apply a reverse carry binary counter to the pairing of data elements a number of digits k in the counter is chosen such that the number of pairs is greater than or equal to one half the size of the buffer, $2^k>=B/2$. Where each group comprises an even and the following odd numbered element, a group index (or sequence value is multiplied by two to get the index of the even element. In a simplest example, B is a power of two. Where B is not a power of two, sequence values greater than or equal to B are discarded as they are generated.

Another example of operation S805 uses a pseudorandom binary sequence (PRBS) to generate sequence values for different groups. The PRBS can be used to generate a pseudorandom sequence of numbers which can be used as the pairing sequence. A linear feedback shift register of n digits can be used to generate a sequence of $2^n-1$ values (starting at 1). The number of digits is chosen such that the $2^n-1>=B$, an adjustment is made to start at zero, and values produced $>=B$ are discarded as with the reverse-carry method.

Although similar to the reverse-carry method, this approach results in a different appearance in the display which may be considered favorable. A potential drawback is that it may not distribute the pairings as evenly across the data and can result in "clumping" of paired values.

Yet another example of the method of operation 5905 uses a table to generate sequence values for different groups. The table contains B/2 unique even values from 0 to B−2 that describe the pairings. By using a table, any desired sequence of pairings can be performed. It can be custom tailored for any value of B. For efficiency of computation the sequences generated by the reverse-carry and PRBS methods above may be pre-computed and placed in a static table.

In the above-described methods, additional information may be provided with or computed using the data elements. Such additional information may include, for instance, an indication of a first measurement taken in an interval, a last measurement, a number of measurements, an average or total of the measurements, sum of squares of the measurements (for use in standard deviation calculation), etc. Additional information is maintained as part of resulting data elements when compression occurs. This would include, for instance, keeping appropriate first and last values, totaling the number of measurements, computing a weighted average, totaling a number of squares, etc.

The above-described methods can be combined with various display techniques to improve the appearance of the displayed data. One example of such a technique is to expand adjacent display elements so they are connected. For instance, a vertical bar in one display column may be inspected to determine whether it overlaps with a vertical bar of a next column. If so, the bars are already connected. If not, one or both of the bars may be extended to reach or overlap with the other. A relatively simple approach is to do this while "sweeping" across the graph by increasing the range of each column's bar to match that of the previous column. Additional information can be kept with the data and this can be used as part of a connecting method such as connecting from the last measurement value of one column to the first value of the next.

In the above and other embodiments, calculating pixel locations from measurement values can be a computational burden. This burden can be mitigated by storing pixel values for each data element along with the measurement value the first time it is computed. As long as scaling parameters of the graph are not altered these pixel values can be used. If the scaling parameters change then an initial recalculation and storing to memory may be required.

As indicated by the foregoing, in certain embodiments, measurements are taken at a regular rate, allowing a trend graph to have a time-based axis. However, the described embodiments can also be adapted to irregular readings and the results presented as an "event" axis. In some embodiments, as illustrated in the drawings, measurement values are represented on a vertical axis of a trend graph and time (or event sequence) is represented on a horizontal axis. In alternative embodiments, these axes can be swapped or otherwise modified.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method, comprising:
    storing a stream of data elements in a buffer having a storage capacity corresponding to a first number of data elements;
    compressing the stored data elements to fit within a display having a size corresponding to a second number of data elements smaller than the first number of data elements;
    detecting an event; and
    as a consequence detecting the event, compressing the stored data elements to occupy a reduced portion of the buffer.

2. The method of claim 1, wherein the event is a completed filling of the buffer.

3. The method of claim 1, further comprising storing additional data elements in the buffer, and further compressing the stored data elements to fit within the display.

4. The method of claim 1, further comprising displaying the stored data elements that have been compressed to fit within the display in a trend graph.

5. The method of claim 1, wherein the first number is an integer multiple of the second number.

6. The method of claim 1, wherein the stored data is compressed by a residue accumulation method.

7. The method of claim 1, wherein each of the data elements comprises a pair of minimum and maximum measurement values for a corresponding measurement interval.

8. The method of claim 1, further comprising storing a compression factor of the buffer, and storing the stream of data elements in the buffer with the compression factor.

9. The method of claim 8, further comprising increasing the stored compression factor upon compressing the stored data elements to occupy a reduced portion of the buffer.

10. The method of claim 1, wherein compressing the stored data elements to fit within the display comprises determining a number of data elements to be mapped to each display column of the display and combining the data elements stored the buffer according to the determined number.

11. The method of claim 1, wherein compressing the stored data elements to fit within the display comprises determining a sequence of data element groupings based on the first number of data elements and the second number of data elements, and applying the sequence of data element groupings to the data elements stored in the buffer.

12. The method of claim 11, wherein the sequence of data element groupings is determined by a reverse carry binary counter.

13. The method of claim 11, wherein the sequence of data element groupings is determined according to a pseudorandom binary sequence (PRBS).

14. The method of claim 11, wherein the sequence of data element groupings is determined according to a table.

15. The method of claim 1, further comprising tagging the data elements stored in the buffer to indicate the sequence of data element groupings, and compressing the stored data elements to fit within the display according to the tags.

16. A system for generating a trend graph, comprising:
    a buffer configured to store a first number of data elements;
    a mapping unit configured to compress the stored data elements to fit within a display capable of accommodating a second number of data elements smaller than the first number of data elements; and
    a controller configured to detect an event and to compress the stored data elements to occupy a reduced portion of the buffer as a consequence of detecting the event.

17. The system of claim 16, wherein the event comprises a filling of the buffer.

18. The system of claim 16, wherein the display is part of a digital multi-meter.

19. The system of claim 16, wherein the data elements comprise minimum and maximum measurement values for corresponding measurement intervals.

20. The system of claim 19, wherein the mapping unit compresses at least one of the data elements by determining a smallest minimum and a largest maximum among a group of data elements stored in the buffer and forming a new data element from the smallest minimum and largest maximum.

* * * * *

UNITED STATES PATENT AND TRADEMARK OFFICE
CERTIFICATE OF CORRECTION

PATENT NO.       : 8,818,119 B2
APPLICATION NO.  : 13/628010
DATED            : August 26, 2014
INVENTOR(S)      : Brian W. Kerr et al.

Page 1 of 1

It is certified that error appears in the above-identified patent and that said Letters Patent is hereby corrected as shown below:

In the Claims

In column 14, line 45, In Claim 15, delete "claim 1," and insert -- claim 11, --, therefor.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,818,119 B2 | Page 1 of 1 |
| APPLICATION NO. | : 13/628010 | |
| DATED | : August 26, 2014 | |
| INVENTOR(S) | : Brian W. Kerr et al. | |

It is certified that error appears in the above-identified patent and that said Letters Patent is hereby corrected as shown below:

In The Claims

In column 14, line 2, change "as a consequence determining" to --as a consequence of determining--

Signed and Sealed this
Sixteenth Day of December, 2014

Michelle K. Lee
*Deputy Director of the United States Patent and Trademark Office*